US006657006B2

(12) United States Patent
Beuzelin et al.

(10) Patent No.: US 6,657,006 B2
(45) Date of Patent: *Dec. 2, 2003

(54) COEXTRUSION BINDER COMPOSITION AND COEXTRUDED MULTILAYER COMPOSITE IN WHICH THE SAID COMPOSITION IS EMPLOYED AS ADHESIVE LAYER

(75) Inventors: Catherine Beuzelin, Bernay (FR); Alain Bouilloux, Bernay (FR); Jean-Claude Jammet, Glisolles (FR); Yves Trolez, Saint-Fons (FR)

(73) Assignee: Atofina, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/399,690

(22) Filed: Mar. 7, 1995

(65) Prior Publication Data

US 2003/0013807 A1 Jan. 16, 2003

(30) Foreign Application Priority Data

Mar. 16, 1994 (FR) .............................. 94 03101

(51) Int. Cl.⁷ ............................... C08G 63/48
(52) U.S. Cl. ..................... 525/71; 525/74; 525/193; 525/285
(58) Field of Search ................. 525/71, 195, 285, 525/74

(56) References Cited

U.S. PATENT DOCUMENTS

| 4,619,972 A |   | 10/1986 | Inoue et al. ............... 525/193 |
|---|---|---|---|
| 4,684,578 A |   | 8/1987 | Inoue et al. ............... 428/462 |
| 4,902,749 A | * | 2/1990 | Akkapeddi et al. .......... 525/66 |
| 5,312,867 A | * | 5/1994 | Mitsuno et al. ............ 525/66 |
| 5,418,055 A | * | 5/1995 | Chen et al. ............... 428/317.7 |
| 5,436,397 A | * | 7/1995 | Okada ...................... 524/494 |

FOREIGN PATENT DOCUMENTS

| EP | 0048512 | * | 9/1980 | ................. 525/193 |
|---|---|---|---|---|
| EP | 0 520 515 A3 |  | 12/1992 |  |
| EP | 0 520 515 A2 |  | 12/1992 |  |
| GB | 2 247 458 A |  | 3/1992 |  |

OTHER PUBLICATIONS

Sekisui Chem. Ind. Co. Ltd., Derwent WPI, AN 93–331018, Sep. 1993.

* cited by examiner

Primary Examiner—Edward J. Cain
(74) Attorney, Agent, or Firm—Pennie & Edmonds LLP

(57) ABSTRACT

This composition includes:
at least one out of (A1) the graft polymers resulting from the grafting of at least one grafting monomer such as maleic anhydride onto (a) impact or crystal styrene homopolymers and copolymers and/or (b) optionally hydrogenated styrene-diene elastomer block polymers, (b) not being the only polymer in the mixture of (A) and (B);

(A2) at least one copolymer (b) mixed with at least one polymer (B1);

(A3) graft polymers resulting from the cografting of at least one grafting monomer onto a mixture of at least one polymer (a) and of at least one of (c) ethylene-vinyl acetate copolymers, ethylene-alkyl (meth)acrylate copolymers, ethylene homopolymers, and ethylene-α-olefin copolymers;

(A4) graft polymers resulting from the cografting of at least one grafting monomer onto at least one polymer (a) to which at least one tackifying resin (d) has been added, these graft polymers being mixed with at least one polymer (B1); and optionally at least one out of (B1) graft polymers resulting from the grafting of at least one grafting monomer onto a polymer (c); and (B2) (ethylene-α-olefin or vinyl acetate or alkyl (meth)acrylate-monomer of the type of the above-mentioned grafting monomers) terpolymers; and (C) the polymers (a), (b), and (c).

11 Claims, No Drawings

COEXTRUSION BINDER COMPOSITION AND COEXTRUDED MULTILAYER COMPOSITE IN WHICH THE SAID COMPOSITION IS EMPLOYED AS ADHESIVE LAYER

FIELD OF THE INVENTION

The present invention relates to a coextrusion binder composition and to coextruded multilayer composites in which the said composition is employed as adhesive layer.

BACKGROUND OF THE INVENTION

Coextruded multilayer composites which have an outer layer of polystyrene, polycarbonate or polyester, especially polystyrene, are commonly employed for food containers such as cups and containers of the yogurt or compote pot type and the like, or for films such as thermoformed or heat-sealed lids. However, in these composites the above-mentioned outer layer is generally lined with a layer of ethylene-vinyl alcohol copolymer, polyamide, polyesteramide, polyolefin and the like, or of a mixture of these polymers, which have a poor affinity for it, with the result that provision must be made for an adhesive layer between the two. By way of examples of multilayer composites there may be mentioned those containing three layers (for example polyethylene/binder/polystyrene), or five layers (for example polyethylene/binder/ethylene-vinyl alcohol copolymer/binder/polystyrene) and the like.

The present invention also includes the composites formed by hot lamination or resin-coating, a technology according to which a multilayer including the binder is extruded over a sheet of poly(methyl methacrylate), polystyrene, poly(ethylene terephthalate) and the like, the binder providing especially the adhesion to the sheet.

Many adhesive formulations have been developed for this purpose and are described in the literature. Most of the time these formulations include an ethylene-vinyl acetate copolymer grafted with maleic anhydride and/or styrene, in combination with another component which is especially an ungrafted ethylene-vinyl acetate copolymer, polystyrene, impact polystyrene, a petroleum resin and the like. The compositions described in U.S. Pat. Nos. 4,861,676 and 4,861,677 may be mentioned, among others.

French Patent Application No. 2 677 658 also discloses an adhesive composition obtained by grafting an unsaturated carboxylic acid or a derivative thereof onto a mixture including 40 to 95% by weight of ethylene-(meth)acrylic ester copolymer which has a (meth)acrylic ester content of 25 to 45% by weight, 5 to 30% by weight of polystyrene and 0 to 30% by weight of a polymer which may be an ethylene-vinyl acetate copolymer.

While, among the many resins presented in the literature, some are satisfactory from the viewpoint of adhesive performance, the latter must still be improved. In addition, the multilayer composites very often do not cut out properly. Such cutting out, generally carried out after the thermoforming or after the filling of the containers and fitting the lid, is performed either by pressure of a metal "net" on a table, or by shearing. If the cutting out is not correct, the thermoformed article remains attached to the sheet from which it has been formed. This gives rise to uncontrolled production stoppages and the changing of the cutter blades.

SUMMARY OF THE INVENTION

We have therefore investigated compositions which have adhesive performances that are correct, or even superior to those of the known compositions, but which can offer the additional advantage of allowing a greater ease of cutting out than the latter.

DESCRIPTION OF THE PREFERRED EMBODIMENTS

These compositions include:

at least one out of (A1) the graft polymers resulting from the grafting of at least one grafting monomer such as maleic anhydride onto (a) impact or crystal styrene homopolymers and copolymers and/or (b) optionally hydrogenated styrene-diene elastomer block polymers, (b) not being the only polymer in the mixture of (A) and (B);

(A2) at least one copolymer (b) mixed with at least one polymer (B1);

(A3) graft polymers resulting from the cografting of at least one grafting monomer onto a mixture of at least one polymer (a) and of at least one of (c) ethylene-vinyl acetate copolymers, ethylene-α-alkyl (meth)acrylate copolymers, ethylene homopolymers, and ethylene-α-olefin copolymers;

(A4) graft polymers resulting from the cografting of at least one grafting monomer onto at least one polymer (a) to which at least one tackifying resin (d) has been added, these graft polymers being mixed with at least one polymer (B1); and optionally at least one out of (B1) graft polymers resulting from the grafting of at least one grafting monomer onto a polymer (c); and (B2) (ethylene-α-olefin or vinyl acetate or alkyl (meth) acrylate-monomer of the type of the above-mentioned grafting monomers) terpolymers; and (C) the polymers (a), (b), and (c).

In accordance with the present invention, a coextrusion binder composition is proposed first of all, characterized in that it includes:

at least one polymer (A) chosen from:

(A1) graft polymers resulting from the grafting of at least one grafting monomer chosen from carboxylic acids containing ethylenic unsaturation, the corresponding acid anhydrides and the derivatives of these acids and acid anhydrides, onto (a) impact or crystal styrene homopolymers and copolymers; and/or (b) styrene-diene elastomer block polymers and these same copolymers in the hydrogenated state, provided that (b) is not the only polymer in the mixture of (A) and optionally (B);

(A2) at least one copolymer (b) as defined above mixed with at least one polymer (B1) as defined below;

(A3) graft polymers resulting from the cografting of at least one grafting monomer as defined above onto a mixture:

of at least one polymer (a) as defined above; and of at least one out of (c) ethylene-vinyl acetate copolymers, ethylene-alkyl (meth)acrylate copolymers, ethylene homopolymers and ethylene-α-olefin copolymers, provided that the ethylene-alkyl (meth) acrylate copolymers may not represent more than 40% by weight of the mixture subjected to the cografting in the case of a polystyrene content lower than 30% by weight if (A3) represents the major constituent of the binder composition;

(A4) graft polymers resulting from the cografting of at least one grafting monomer as defined above onto at least one polymer (a) as defined above, to which at least one tackifying resin (resin possessing adhesive bondability) (d) has been added, these graft polymers being furthermore mixed with at least one polymer (B1) as defined below; and optionally at least one out of:
(B) the polymers chosen from:
(B1) graft polymers resulting from the grafting of at least one grafting monomer as defined above onto a polymer (c) chosen from ethylene-vinyl acetate copolymers, ethylene-α-olefin copolymers, ethylene-alkyl (meth)acrylate copolymers, ethylene homopolymers; and
(B2) (ethylene-α-olefin or vinyl acetate or alkyl (meth) acrylate-monomer of the type of the abovementioned grafting monomers) terpolymers; and
(C) the polymers (a), (b) and (c) as defined above.

In general, each of the graft polymers (A1), (B1), the cografted copolymers (A3) and all the polymers comprising a cografted resin (d), included within the formulations of the compositions of the invention, comprise from 0.005 to 5% by weight of units originating from the grafting monomer(s) relative to the polymer of to the mixture of polymers subjected to grafting. The grafting monomers are chosen especially from (meth)acrylic acid, maleic acid, fumaric acid, itaconic acid, crotonic acid, itaconic anhydride, maleic anhydride or a substituted maleic anhydride, such as dimethylmaleic anhydride or else a salt, amide, imide and ester of a carboxylic acid containing ethylenic unsaturation, such as mono- and disodium maleate, acrylamide, maleimide and diethyl fumarate. Maleic anhydride and maleic acid are preferred.

The grafting may be performed by a known method consisting in melting the polymer(s) to be grafted, adding thereto the grafting monomer and from 50 to 20 000 ppm, relative to the polymer(s) of a radical polymerization initiator, mixing so as to obtain a uniform distribution of the grafting monomer and of the initiator in the polymer(s), kneading the resulting mixture in an extruder at a temperature above the melting point of the polymer(s), extruding the resulting graft polymer as a shaped article, tablets or other forms which are subsequently employed as such or as a mixture with other polymers, with a view to the coextrusion of multilayer structures, as will be described below.

Apart from this grafting in an extruder, another possible method which may also be mentioned is grafting in solution, consisting in dissolving the polymer(s) to be grafted in a solvent and adding thereto the grafting monomer(s) and the initiator to perform the graft polymerization at a temperature of between 80 and 150° C.

The free radical initiator may belong to different classes which are well known to a person skilled in the art. Among these there may be mentioned peroxides, peresters, hydroperoxides and diazo compounds. Peroxides which may be mentioned are dicumyl peroxide, di-tert-butyl peroxide, benzoyl peroxide, lauroyl peroxide, α,α'-bis(t-butylperoxy-m-isopropyl)benzene, 2,5-dimethyl-2,5-di(t-butylperoxy) hexane and 2,5-dimethyl-2,5-di(t-butylperoxy)-3-hexyne. Tertiary butyl perbenzoate may be mentioned as perester, t-butyl hydroperoxide and cumene hydroperoxide as hydroperoxide, and azobisisobutyronitrile as diazo compound.

If reference is made to the general definition of the compositions according to the invention it may be seen that a grafting may be performed, for example on a polystyrene, and then, if appropriate, the resulting graft polymer may be "diluted" with at least one other polymer, which itself may be grafted. Another solution consists in performing a cografting, for example, on a polystyrene and an ethylene-vinyl acetate copolymer, which offers the advantage of simplifying the manufacture, since the required composition is obtained directly if the cografting is not followed by a dilution.

The polymers (a) included within the composition according to the invention include styrene homopolymers and copolymers (crystal polymers) and polystyrenes containing rubbery components (impact polymers), in particular those referred to as high-impact.

Examples of styrene copolymers which may be mentioned are chloropolystyrene, poly-α-methylstyrene, styrene-chlorostyrene copolymers, styrene-propylene copolymers, styrene-butadiene copolymers, styrene-isoprene copolymers, styrene-vinyl chloride copolymers, styrene-vinyl acetate copolymers, styrene-alkyl acrylate (methyl, ethyl, butyl, octyl, phenyl acrylate) copolymers, styrene-alkyl methacrylate (methyl, ethyl, butyl, phenyl methacrylate) copolymers, styrene-methyl α-chloroacrylate copolymers and styrene-acrylonitrile-alkyl acrylate copolymers. The comonomer content in these copolymers generally ranges up to 20% by weight.

The polystyrenes containing rubbery components are especially those containing from 1 to 20% by weight of units originating from the rubbery components which are, for example, butadiene and isoprene.

The copolymers (b) are the above-mentioned block copolymers obtained by copolymerization of styrene and of a diene such as butadiene and isoprene. Diblock styrene-butadiene and styrene-isoprene and triblock styrene-butadiene-styrene and styrene-isoprene-styrene copolymers may be mentioned. Their preparation enables linear or branched products to be obtained. These same copolymers may be hydrogenated. SEBSs or SEPSs are thus obtained, depending on whether SBSs or SISs are employed as base for the hydrogenation. The styrene content of these copolymers is lower than or equal to 50% by weight. The styrene/diene weight ratios are especially between 10/90 and 50/50.

The polymers (c), also included within the definition of the component (A3), are especially:

ethylene-vinyl acetate copolymers which have a vinyl acetate content generally lower than 60% by weight, especially lower than 50% by weight;

ethylene homopolymers and copolymers of ethylene and of at least one alpha-olefin (all copolymers commonly denoted by PE, LDPE, LLDPE, VLDPE, HDPE and EPR). The alpha-olefin generally contains 3 to 12 carbon atoms and is chosen especially from propylene, 1-butene, 4-methyl-1-pentene, 1-hexene, 1-octene and their mixtures. The content of units derived from ethylene is generally at least 40% by weight and the relative density of these homo- and copolymers is generally between 0.880 and 0.970;

ethylene-alkyl, in particular $C_1$–$C_{12}$ alkyl, (meth)acrylate copolymers which have a (meth)acrylate content generally of between 5 and 60% by weight, preferably between 7 and 40% by weight; methyl, ethyl and butyl (meth)acrylates may be mentioned as alkyl (meth) acrylates.

Furthermore, a quantity of at least one resin which has an adhesive bondability (d) may be added to at least one of the polymers or mixtures of polymers subjected to a grafting or to a cografting, in order to lead to a grafting or cografting product included within the composition of the invention.

As tackifying resins (d) which may be included within the composition of the coextrusion binder according to the invention in the cografted state, there may be mentioned styrene-based resins such as poly-α-methylstyrene resins, rosin resins, rosin ester resins, aliphatic petroleum resins and terpene, terpene-phenolic, coumarone and coumarone-indene aromatic resins. These resins generally cannot represent more than 40% by weight of the composition. The content of these tackifying resins in the composition, which depends on the required melt index, does not preferably exceed 10% by weight. Furthermore, some may be hydrogenated, such as rosin resins, aliphatic petroleum resins and terpene resins.

Compositions according to the invention which have been found particularly advantageous are the following (the total composition representing 100% by weight each time):

compositions consisting of:
5 to 70% by weight, in particular 5 to 45% by weight, of polystyrenes consisting of at least one impact or crystal polystyrene grafted with optionally ungrafted impact polystyrene, it being possible for the latter to represent up to 40% by weight of the composition; and
30 to 95% by weight, in particular 55 to 95% by weight, of an ethylene-vinyl acetate graft copolymer or of an ethylene-alkyl (meth)acrylate graft copolymer or of an (ethylene-vinyl acetate or alkyl (meth)acrylate-maleic anhydride) terpolymer, the grafts being grafts with maleic anhydride, optionally mixed with impact or crystal polystyrene and/or an ethylene-vinyl acetate copolymer and/or an ethylene-alkyl (meth)acrylate copolymer;

compositions consisting of the product of cografting of maleic anhydride onto a mixture of:
5 to 70% by weight, in particular 5 to 45% by weight, of at least one impact or crystal polystyrene; and
30 to 95% by weight, in particular 55% to 95% by weight, of an ethylene-vinyl acetate copolymer and/or of an ethylene-alkyl (meth)acrylate copolymer, the condition indicated in the case of (A3) being furthermore complied with, optionally mixed with impact or crystal polystyrene and/or an ethylene-vinyl acetate copolymer and/or an ethylene-alkyl (meth)acrylate copolymer;

compositions consisting of:
10 to 40% by weight of the product of cografting of maleic anhydride onto a mixture of impact polystyrene and of a minor quantity of an alpha-methylstyrene tackifying resin; and
60 to 90% by weight of ethylene-vinyl acetate graft or ethylene-methyl (meth)acrylate graft copolymer; and compositions consisting of:
10 to 30% by weight of a styrene-butadiene-styrene block copolymer; and
70 to 90% by weight of ethylene-vinyl acetate copolymer grafted with maleic anhydride.

The present invention also relates to a coextruded multilayer composite including at least once the succession of the following three layers:

a layer of polystyrene or of polycarbonate or of polyester,
a layer of the coextrusion binder composition as defined above; and
a layer consisting of at least one resin chosen from polyolefins, ethylene-vinyl alcohol copolymers, polyamides and polyesters.

The following combinations may be mentioned in particular:

PS/binder/EVOH, PS/binder/PA, PS/binder/PET, PS/binder/PO, PS/binder/EVOH/binder/PS, PS/binder/EVOH/binder/PO, PS/binder/EVOH/binder/PET and PS/binder/EVOH/PA/binder/PS, where PS=polystyrene, EVOH=ethylene-vinyl alcohol copolymer, PA=polyamide, PET=poly(ethylene terephthalate) and PO=polyolefin.

The polystyrenes PS are as defined above.

Polyolefins PO here include an ethylene-α-olefin copolymer, an ethylene-vinyl acetate copolymer, ethylene-alkyl (meth)acrylate copolymers which have an alkyl (meth)acrylate content lower than 25% by weight, low-density polyethylenes, high-density polyethylenes, polypropylenes and mixtures of these polymers.

Ethylene-vinyl alcohol EVOH copolymers include saponified ethylene-vinyl acetate copolymers which have a degree of saponification of at least 50 mol %. It is preferable that these polymers should contain at least 30 mol % of vinyl alcohol units, to obtain good adhesiveness and gas impermeability properties.

The polyamides PA are linear polymers containing acid amide bonds, obtained by condensation of diamines and dicarboxylic acids, condensation of aminoacids or decyclization of lactams. Representative examples of these polyamides are nylon 6, nylon 6-6, nylon 6-10, nylon 11 and nylon 12.

The polyesters employed in the coextruded composites of the present invention are polymers obtained by condensation of saturated diacids and of glycols. It is possible to mention in particular poly(ethylene terephthalate) obtained from ethylene glycol and terephthalic acid, poly(ethylene terephthalate) copolymers which have, as copolymerization component, a saturated diacid such as phthalic acid, isophthalic acid, sebacic acid, adipic acid, azelaic acid, glutamic acid, succinic acid, oxalic acid and the like, poly(ethylene terephthalate) copolymers which have, as copolymerization component, a diol such as 1,4-cyclohexanedimethanol, diethylene glycol, propylene glycol and the like, and mixtures of these polymers.

The thickness of the composite of the present invention is from 100 μm to 3 mm, preferably 500 μm to 2 mm. In the case of the composite containing three layers of polystyrene/binder/sealing material (such as a low-density polyethylene, a linear low-density polyethylene, an ethylene-vinyl acetate copolymer and the like), the thickness of the composite is from 100 to 1000 μm, preferably 100 to 600 μm. The thickness of the polystyrene layer in the composite according to the present invention represents 30 to 96%, preferably 60 to 90%, of the total thickness of the laminate. The thickness of the binder composition layer represents 1 to 35%, preferably 2 to 20%, of the total thickness of the composite, and the thickness of the sealing material layer represents 1 to 35%, preferably 2 to 20% of the total thickness of the composite.

The peel strength of the composites of the present invention, in the case where the thickness of the binder layer is 30 μm, is higher than 6 N/15 mm, generally at least 9 N/15 mm.

The binder compositions according to the present invention and the multilayer composites employing these compositions have excellent properties of adhesive strength and of resistance to the separation of the layers after coextrusion, as well as excellent cutting-out properties, with the result that they are very useful for food containers and the like.

The following examples illustrate the invention without, however, limiting its scope. In these examples the percentages are given by weight unless indicated otherwise. The particular compositions of coextrusion binders used in these examples belong to types II to IX, detailed in Table 1 below, type I representing the reference composition. In this table the constituents are indicated, the following abbreviations being employed:

| | |
|---|---|
| PS | polystyrene |
| EVA copo | ethylene-vinyl acetate copolymer |
| EMA copo | ethylene-methyl acrylate copolymer |
| EVA/MA terpo | ethylene-vinyl acetate-maleic anhydride terpolymer |
| EBA/MA terpo | ethylene-butyl acrylate-maleic anhydride terpolymer |
| g MA | grafted with maleic anhydride. |

TABLE 1

| Coextrusion binder composition | Components | | |
|---|---|---|---|
| type | (A) | (B) | (C) |
| I (reference) | | EVA copo g MA | |
| II | impact PS g MA | EVA copo g MA | impact PS |
| III | impact PS g MA | EVA copo g MA | |
| IV | SBS block copo + EVA copo g MA | | |
| V | impact PS g MA | EMA copo g MA | |
| VI | impact PS g MA | EBA or EVA/MA terpo | |
| VII | impact PS g MA + crystal PS g MA | EVA copo g MA | |
| VIII | (impact PS + poly-α-methylstyrene resin) g MA | EVA copo g MA | |
| IX | (impact PS + EVA copo) g MA | | |
| X | (crystal PS + EVA copo) g MA | | |

Furthermore, the particular constituents below were used in these examples (see also first column of Table 2). The constituent unit contents of the various graft copolymers are here weight contents measured by FTIR spectroscopy; the melt indices, expressed in g/10 min, were measured according to ASTM standard D-1238 in condition (L) (23° C., 2.16 kg) in the case of impact PS, crystal PS and in condition (E) (190° C., 2.16 kg) in the case of impact PS g MA, crystal PS g MA and other copolymers and terpolymers; the Izod impact strength was measured according to ISO standard 180/1A, and the Vicat softening temperature according to ISO standard 306 B.

The melting points were obtained according to the ATD method.

Individual Constituents Used

The impact PSs 1, 2, 3 and 4 and the crystal PS employed in the examples are polystyrenes marketed under the series name "Lacqrène" by the company Elf Atochem S.A. Their characteristics are recalled in Table 2 below:

TABLE 2

| PS | Lacqrène | Melt index (g/10 mm) | Izod impact strength (kJ/m$^2$) | Vicat softening temperature (° C.) |
|---|---|---|---|---|
| impact 1 | 8350 | 4.5 | 13 | 85 |
| impact 2 | 7240 | 4.5 | 11 | 87 |
| impact 3 | 5240 | 4.5 | 13 | 85 |

TABLE 2-continued

| PS | Lacqrène | Melt index (g/10 mm) | Izod impact strength (kJ/m$^2$) | Vicat softening temperature (° C.) |
|---|---|---|---|---|
| impact 4 | 3351 | 4.5 | 8 | 94 |
| crystal | 1160 | 2.5 | | 98 |

Preparation of Impact PS 1 g MA (Lacqrène 8350 g MA)

Lacqrène 8350 impact polystyrene and maleic anhydride, in a ratio of 1.5% by weight relative to the impact polystyrene, are introduced into a corotative twin-screw extruder of Werner 30 type (12 barrels, 30 mm diameter). 8500 ppm of 2,5-dimethyl-2,5-di(t-butylperoxy)hexane (Trigonox 101) are injected sideways into the extruder at barrel No. 4. The barrel temperatures displayed are between 180° C. (barrel No. 1) and 210° C. (barrel No. 10). The stock temperature is approximately 200° C. The residues of free maleic anhydride are removed by degassing at barrel No. 10. The overall throughput of the extruder is 20 kg/hour and the speed of rotation of the screws 280 rev/min. Impact polystyrene grafted with 0.9% of maleic anhydride and exhibiting a melt index of 3.2 is obtained.

Preparation of Impact PS 2 g MA (Lacqrène 7240 g MA)

The procedure is as for the preparation of impact PS 1 g MA, except that impact PS 2 is employed. The polymer obtained is an impact polystyrene grafted with 0.96% of maleic anhydride and exhibiting a melt index of 3.3.

Preparation of Impact PS 3 g MA (Lacqrène 5240 g MA)

The procedure is as for the preparation of impact PS 1 g MA, except that impact PS 3 and 15 000 ppm of Trigonox 101 are employed. The polymer obtained is an impact polystyrene grafted with 1.2% of maleic anhydride and with a melt index of 3.1.

Preparation of Crystal PS g MA (Lacqrène 1160 g MA)

The procedure is essentially as for the preparation of impact PS 1 g MA, except that Lacqrène 1160 crystal PS is employed. The proportion of maleic anhydride introduced is 1.5% by weight, and 1.1% by weight of Trigonox 101 is injected sideways, these quantities being in relation to the crystal PS. The speed of rotation of the screws is 130 rev/min and the throughput is 10 kg/hour. Crystal polystyrene grafted with 0.98% of maleic anhydride, with a melt index of 3.3, is obtained.

Preparation of EVA copo g MA

Into the hopper of a corotative twin-screw extruder of Werner 30 type (see above) are introduced: an ethylene-vinyl acetate copolymer (vinyl acetate content: 28% by weight, melt index: 4), maleic anhydride in a proportion of 0.25% relative to the EVA copolymer, and 2,5-dimethyl-2,5-di(t-butylperoxy)hexane (Luperox 101) in a proportion of 200 ppm relative to the EVA copolymer. The displayed temperatures of the barrels are between 170° C. (barrel No. 1) and 220° C. (barrel No. 8). The stock temperature is approximately 200° C. The residues of free maleic anhydride are removed by degassing at barrel No. 10. The overall throughput of the extruder is 15 kg/hour. An EVA copolymer grafted with 2000 ppm of maleic anhydride is obtained, exhibiting a melt index of 3 to 3.5, a melting point of 75° C. and a Vicat softening point of 51° C.

Preparation of EMA copo g MA

Into the hopper of a corotative twin-screw extruder of Werner 30 type (see above) are introduced: an ethylene-methyl acrylate copolymer (methyl acrylate content: 29%, melt index: 3.1), maleic anhydride in a proportion of 0.5% relative to the EMA copolymer, and Luperox 101 in a proportion of 150 ppm relative to the EMA copolymer. The stock temperature is approximately 200° C. The residues of free maleic anhydride are removed by degassing in line. The expected polymer is obtained, that is an EMA grafted with 2300 ppm of maleic anhydride and exhibiting a melt index of 2.5, a melting point of 66° C. and a Vicat softening point lower than 40° C.

The EVA copolymer employed in the examples, marketed by the company Elf Atochem S.A. under the name "Evatane 2805", has a vinyl acetate content of 27–29% by weight, a melt index of 5–8 g/10 min, a melting point of 73° C. and a Vicat softening point of 43° C.

The SBS block copolymer employed in the examples is the styrene-butadiene-styrene triblock linear copolymer marketed under the name "Cariflex KX 139".

The poly-α-methylstyrene resin employed in the examples is the resin marketed by the company DSM under the name "Kristallex F 120".

The EVA/MA terpolymer employed in the examples is an ethylene-vinyl acetate-maleic anhydride terpolymer which has a melt index of 7 g/10 min and a vinyl acetate weight content of 26%.

The EBA/MA terpolymer employed in the examples, marketed by Elf Atochem S.A. under the name "Lotader 3700" is an ethylene-butyl acrylate-maleic anhydride terpolymer which has a melt index of 6 g/10 min and a butyl acrylate weight content of 30%.

Examples 1 to 25 which follow illustrate the preparation of binder compositions for reference and according to the invention (Examples 2 to 25). These compositions have been evaluated for adhesiveness after coextrusion at 220° C. of a five-layered sheet with a total thickness of 790 microns and which has the characteristics reported in Table 3, which follows:

TABLE 3

| Layer number | Layer composition | Trade name | Thickness (μm) |
|---|---|---|---|
| 1 | impact PS | Lacqrène 8350 (Elf Atochem S.A.) | 600 |
| 2 | Binder subjected to the test | | 30 |
| 3 | EVOH copo (ethylene-vinyl alcohol copolymer containing 62 mol % of vinyl alcohol) | Soarnol ET | 30 |
| 4 | Binder subjected to the test | | 30 |
| 5 | Low density PE | Lacqtène 1020 FN 24 (Elf Atochem S.A.) | 100 |

For the evaluation of adhesiveness, the peeling is conducted in a laboratory conforming to the standards of a materials evaluation laboratory, according to NFT standard 76-112 part 2, but with the following modifications: a peeling angle of 90 instead of 180 and test piece width of 15 mm instead of 25 mm.

The test pieces are taken from the middle of the coextruded sheets, in the direction of extrusion. The peeling speed is 200 mm/minute. The determination of the peel strengths, on the recordings obtained, is performed according to ISO standard 6133. The reproducibility of the complete sequence (coextrusion/peeling) was verified by employing the same binder a number of times on different days and at different times.

EXAMPLE 1 (REFERENCE EXAMPLE)

The five-layered sheet described above was produced with EVA copo g MA as binder. This example illustrates what it is possible to obtain in terms of peel strength.

EXAMPLE 2

A mixture prepared by dry mixing of granules which have the weight composition reported in Table 5 is introduced into the hopper of a Buss PR 46/70 co-kneader (L/D=11), fitted with a recycle screw. The overall throughput of the plant is 25 kg/h, the speed of rotation of the kneader is 200 rev/min and the stock temperatures between 200° C. and 205° C. The speed of rotation of the recycle screw is 33 rev/min. Vacuum is applied at well No. 3 of the co-kneader. The compound obtained has a melt index of 2.6. It is subsequently employed in a five-layered composite prepared as shown above. The peel strengths are reported in Table 6.

EXAMPLES 3 TO 16

The procedure is as in Example 2, the constituents being varied in their nature and their proportion as shown in Table 5. The results, shown in this same table, in terms of peel strength, are always superior to those of reference Example 1.

EXAMPLE 17

EVA copo g MA and a "cograft" (impact PS 1+poly-α-methylstyrene resin) g MA, prepared as described in the following example, are mixed as in Example 2. The peel strength results are shown in Table 5.

EXAMPLE 18

Into a corotative twin-screw extruder of Werner type (12 barrels) is introduced a mixture of granules consisting of 30% by weight of impact PS 4 and 70% by weight of EVA copo, 0.5% by weight of maleic anhydride and 150 ppm of Luperox 101 on a polyethylene powder carrier. The mixture is extruded at a throughput of 15 kg/hour (200 rev/min) and at a stock temperature of approximately 210° C. The volatile substances (ungrafted maleic anhydride and peroxide residues) are degassed in line at barrel No. 10 of the extruder. The "co-graft" obtained at the extruder exit has a melt index of 2.2 and a graft content of 1600 ppm of grafted MA. The binder thus obtained is introduced into a five-layered composite and then coextruded as shown in Example 2. The peel strengths obtained are reported in Table 5.

EXAMPLES 19 TO 25

The procedure is as in Example 18, but with the variants reported in Tables 4 and 5 below. Table 5 gives the composition and the results relating to the peel strengths.

TABLE 4

| Example | % of maleic anhydride introduced | Quantity of organic peroxide introduced (ppm) | Extrusion throughput (kg/h) | Melt index of the co-graft obtained (g/10 min) (190° C., 2.16 kg) | Grafting content (ppm of MA) |
|---|---|---|---|---|---|
| 19 | 0.5 | 150 | 15 | 1.8 | 2500 |
| 20 | 0.375 | 114 | 20 | 2.8 | 2000 |
| 21 | 0.5 | 150 | 15 | 3.8 | 3300 |
| 22 | 0.5 | 150 | 15 | 4 | 2700 |
| 23 | 0.5 | 150 | 15 | 3.6 | 4000 |
| 24 | 0.5 | 150 | 15 | 3 | 3300 |
| 25 | 0.375 | 114 | 20 | 3.3 | 1700 |

TABLE 5

| Constituents of the extrusion | | Type | COMPOSITION TYPE | | | | | | | | | | | | | | | | | | | | | | | |
|---|---|---|---|---|---|---|---|---|---|---|---|---|---|---|---|---|---|---|---|---|---|---|---|---|---|---|
| | | | I | II | | | | | III | | | | IV | V | | VI | | VII | VIII | | IX | | | | | X |
| binder | EX (Ref) | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| Impact PS 1 g MA (Lacqrene 8350 g MA) | | A1 | | 5 | 25 | 5 | 10 | | 20 | 25 | | | 30 | | | | | 15 | | | | | | | | | |
| Impact PS 2 g MA (Lacqrene 7240 g MA) | | A1 | | | | | | | | | 25 | | | | | | | | | | | | | | | | |
| Impact PS 3 g MA (Lacqrene 5240 g NA) | | A1 | | | | | | 10 | | | | 25 | | | | | | | | | | | | | | | |
| Crystal PS g MA (Lacqrene 1160 g MA) | | A1 | | | | | | | | | | | | | | | | 15 | | | | | | | | | |
| EVA copo g MA | | B1 | 100 | 70 | 70 | 60 | 90 | 90 | 80 | 75 | 75 | 75 | 70 | 80 | | | | 70 | 70 | | | | | | | | |
| EMA copo g MA | | B1 | | | | | | | | | | | | | 70 | | | | | | | | | | | | |
| EVA/MA terpo | | B2 | | | | | | | | | | | | | | 70 | | | | | | | | | | | | |
| EBA/MA terpo (Lotader 3700) | | B2 | | | | | | | | | | | | | | | 70 | | | | | | | | | | | |
| Impact PS 1 (Lacqrene 8350) | | a | | 25 | 5 | 35 | | | | | | | | | | | | | 27* | | 30* | 40* | 20* | 10* | 30* | 40* | |
| Impact PS 4 (Lacqrene 3351) | | a | | | | | | | | | | | | | | | | | | 70* | 60* | 85* | 15* | 80* | 90* | 70* | 60* | 85* |
| Crystal PS (Lacqrene 1160) | | a | | | | | | | | | | | | | | | | | | | | | | | | | | 15* |
| SBS block copo (Cariflex XX 139) | | b | | | | | | | | | | | 20 | | | | | | | | | | | | | | | |
| EVA copo (Evatane 2805) | | c | | | | | | | | | | | | | | | | | | | | | | | | | | |
| Poly-α-methylstyrene resin (Kristalle x F120) | | d | | | | | | | | | | | | | | | | | 3* | | | | | | | | |
| Peel strength (in N/15 mm) | t0 + 8 days | | 7.22–7.82 | 16.67 | 12.75 | 22.06 | 10.79 | 16.61 | 18.63 | 19.31 | 21.56 | 11.17 | 9.81 | 9.41 | 6.18 | 9.81 | 10.79 | 7.16 | 14.71 | 15.15 | 8.21 | 15.20 | 16.07 | 15.24 | 17.88 | 14.07 | 7.84–16.67 |
| | t0 + 1 month | | 6.65–7.37 | 19.62 | 19.62 | 18.72 | 7.33 | 16.31 | 18.05 | 21.56 | 24.12 | 10.98 | 12.75 | 9.81 | 6.86 | 8.82 | 7.84 | 7.84 | 11.77 | 22.01 | 8.44 | 9.32 | 14.61 | 13.73 | 17.67 | 14.42 | 6.86–17.65 |
| | t0 + 2 months | | 6.51–7.35 | 18.85 | 20.33 | 20.29 | 9.81 | 16.65 | 19.32–21.09 | 22.75 | 21.48 | 10.81 | 4.41 | 10.78 | 9.41 | 7.84 | 9.16 | 6.86 | 12.75 | 23.74 | 9.84 | 15.08 | 15.16 | 13.27 | 19.70 | 14.98 | 18.89 |

*cografting - cografing product entering within component 1.4 in the case of Example 17
*cografing - component 1.3 in the case of Examples 18 to 25

What is claimed is:

1. A coextrusion binder composition comprising a polymer or a copolymer polymeric component wherein the polymeric component consists essentially of:
   at least one polymer (A) selected from the group consisting of A1, A2, A3, and A4, wherein the A1, A2, A3, and A4 groups are defined as follows:
   (A1) graft polymers resulting from the grafting of at least one grafting monomer selected from the group consisting of carboxylic acids containing ethylenic unsaturation and the corresponding ethylenically unsaturated carboxylic acid anhydrides onto
      (a) impact or crystal styrene homopolymers or copolymers; and optionally
      (b) styrene-diene elastomer block polymers or styrene-diene elastomer block polymers in the hydrogenated state, provided that (b) is not the only polymer in the mixture of (A) and optionally (B);
   (A2) at least one copolymer selected from the group consisting of styrene-diene elastomer block polymers and styrene-diene block polymers in the hydrogenated state mixed with at least one polymer (B1) as defined below;
   (A3) graft polymers resulting from the cografting of at least one grafting monomer selected from the group consisting of carboxylic acids containing ethylenic unsaturation and the corresponding ethylenically unsaturated carboxylic acid anhydrides onto a mixture:
      of at least one polymer selected from the group of impact or crystal styrene homopolymers and copolymers; and
      of at least one polymer (c) selected from the group consisting of ethylene-vinyl acetate copolymers, and ethylene-alkyl (meth)acrylate copolymers;
   (A4) graft polymers resulting from the cografting of at least one grafting monomer selected from the group consisting of carboxylic acids containing ethylenic unsaturation and the corresponding ethylenically unsaturated carboxylic acid anhydrides onto at least one polymer selected from the group consisting of impact or crystal styrene homopolymers and copolymers, to which at least one tackifying resin (d) has been added, these graft polymers being furthermore mixed with at least one polymer (B1) as defined below; and
   at least one polymer(B) selected from the group consisting of:
   (B1) graft polymers resulting from the grafting of at least one grafting monomer selected from the group consisting of carboxylic acids containing ethylenic unsaturation and the corresponding ethylenically unsaturated carboxylic acid anhydrides onto the polymer (c); and
   (B2) terpolymers comprising a first component comprising ethylene, a second component selected from the group consisting of α-olefin, vinyl acetate and alkyl (meth)acrylate and a third component comprising monomers selected from the group consisting of carboxylic acids containing ethylenic unsaturation and the corresponding ethylenically unsaturated carboxylic acid anhydrides, provided that the ethylene-alkyl (meth)acrylate copolymers may not represent more than 40% by weight of the mixture subjected to the cografting in the case of a polystyrene content lower than 30% by weight if (A3) represents the major constituent of the binder composition.

2. The coextrusion binder composition of claim 1, wherein each of the graft or cografted polymers comprises from 0.005 to 5% by weight of the grafting monomers.

3. The coextrusion binder composition according to claim 1 wherein the grafting monomers are selected from the group consisting of (meth)acrylic acid, maleic acid, fumaric acid, itaconic acid, crotonic acid, itaconic anhydride, maleic anhydride, dimethylmaleic anhydride, a salt, amide, imide and ester of the group consisting of a carboxylic acid containing ethylenic unsaturation, mono- and disodium maleate, acrylamide, maleimide, and diethyl fumarate.

4. The coextrusion binder composition according to claim 1, wherein the polymers (a) is selected from the group consisting of styrene homopolymers, styrene copolymers and styrene polymers containing rubbery components, which have from 1 to 20% by weight of units originating from the rubbery components.

5. The coextrusion binder composition according to claim 1, wherein the polymer (c) is ethylene-vinyl acetate copolymers having a vinyl acetate content lower than 60% by weight.

6. The coextrusion binder composition according to claim 1, wherein at least one graft polymer is the product of cografting of maleic anhydride onto a mixture of:
   5 to 70% by weight of polystyrenes consisting of at least one impact or crystal polystyrene wherein ungrafted portion of polystyrene is up to 40% by weight of the composition; and
   30 to 95% by weight of an ethylene-vinyl acetate graft copolymer or of an ethylene alkyl (meth)acrylate graft copolymer or of an ethylene-vinyl acetate or alkyl (meth)acrylate-maleic anhydride terpolymer.

7. The coextrusion binder composition according to claim 1, wherein the polymer A is a product of cografting of maleic anhydride onto a mixture of:
   5 to 70% by weight of at least one impact or crystal polystyrene; and
   30 to 95% by weight of an ethylene-vinyl acetate copolymer and/or of an ethylene-alkyl (meth)acrylate copolymer.

8. A coextrusion binder comprising a polymer or a copolymer polymeric component, wherein the polymeric component consists essentially of:
   5 to 45% by weight of grafted polystyrene wherein the polystyrene is selected from the group consisting of impact and crystal polystyrene;
   55 to 95% by weight of an ethylene-containing copolymer selected from the group consisting of ethylene-vinyl acetate graft copolymer, ethylene alkyl (meth)acrylate graft copolymer, ethylene-vinyl acetate-maleic anhydride terpolymer, ethylene-alkyl (meth)acrylate-maleic anhydride terpolymer, wherein the grafts are grafts with maleic anhydride.

9. The coextrusion binder according to claim 8, wherein the ethylene-alkyl (meth)acrylate copolymers may not represent more than 40% by weight of the mixture subjected to the cografting in the case of a polystyrene content lower than 30% by weight if a graft polymer represents the major constituent of the binder composition.

10. A coextrusion binder comprising a polymer or a copolymer polymeric component, wherein the polymeric component consists essentially of:
   10 to 40% by weight of the product of cografting of maleic anhydride onto a mixture of impact polystyrene and of an alpha-methylstyrene tackifying resin; and
   60 to 90% by weight of an ethylene copolymer selected from the group consisting of (ethylene-vinyl acetate graft copolymer and ethylene-methyl (meth)acrylate graft copolymer, wherein the grafts are grafts with maleic anhydride.

11. A coextrusion binder comprising a polymer or a copolymer polymeric component, wherein the polymeric component consists essentially of:

10 to 30% by weight of a styrene-butadiene-styrene block copolymer; and

70–90% by weight of an ethylene-vinyl acetate copolymer grafted with maleic anhydride.

* * * * *